Oct. 29, 1968 G. MARTIN 3,408,507

LOGIC PROTECTION CIRCUITS FOR EFFECTING AN $\bar{A}$.B. OPERATION HAVING A COMBINED AND/NOT FUNCTION Filed March 26, 1965 2 Sheets-Sheet 1

INVENTOR
GÉRARD MARTIN
BY
Bacon & Thomas
ATTORNEYS

INVENTOR
GÉRARD MARTIN
BY
Bacon & Thomas
ATTORNEYS

United States Patent Office 3,408,507

Patented Oct. 29, 1968

3,408,507

LOGIC PROTECTION CIRCUITS FOR EFFECTING AN $\bar{A}$.B. OPERATION HAVING A COMBINED AND/NOT FUNCTION Gérard Martin, Noisy-le-Sec, France, assignor to Societe Anonyme dite: Compagnie des Freins et Signaux Westinghouse, Paris, France, a French society of France Filed Mar. 26, 1965, Ser. No. 443,140
Claims priority, application France, Apr. 3, 1964, 969,619
5 Claims. (Cl. 307—210)

ABSTRACT OF THE DISCLOSURE

A logic circuit having a combined AND/NOT function for producing a 0 output in the event an internal component of the circuit malfunctions. A four terminal capacitor is connected to integrate a first recurrent input signal and apply the integrated value of said signal as a bias voltage on a switching transistor. A second recurrent input signal is applied through a driving transistor as a second bias voltage to said switching transistor. The switching transistor is biased to conduct only when the first input signal is absent, the second input signal is present and all the internal circuit components function properly.

Figure 1:
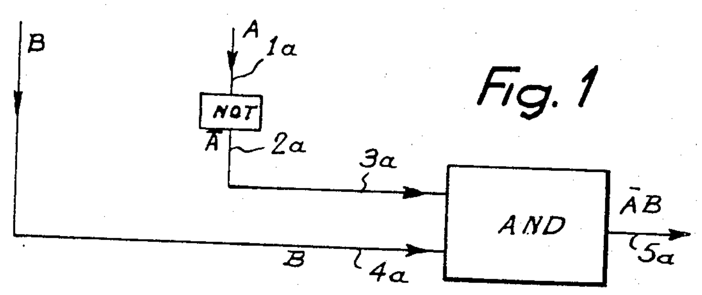

A disadvantage in the use of presently known logic circuits of the NOT type occurs in the event of an internal circuit fault. In that case it is impossible to differentiate between an output signal caused by normal inputs to the circuit and an output signal caused by the fault.

In order to remedy this disadvantage, an $\bar{A}$.B. operator is produced, by the combination of a NOT circuit and an AND circuit, in which the logic functions A and B are recurrent signals produced by elementary logic circuits of the protection type: viz: AND circuit, OR circuit, or memory.

This operator $\bar{A}$.B. finds an interesting use in logical data processing, when it is desired to cause the appearance of a signal, when a first signal is present and when a second signal is absent.

On the other hand, the protection conditions required as much in general industrial installations as for railway traffic purposes in particular, require means of information, of extremely certain operation. It is important that in the case of any one the components of a certain functional system being at fault, the output signal issuing from said latter remains in or passes into a state such that the information transferred is the most restrictive, i.e. always in the sense of the protection required for the given installation.

In particular, semi-conductor logic circuits of the $\bar{A}$.B. type known at this time have the disadvantage that in the case of an accidental short circuit or disconnection of an element, for example a transistor, the output information produces a signal which can in no case be differentiated from that produced respectively by the conduction or non-conduction states of the transistor in question, said states being conditioned in normal operation by the input signal applied to the circuit.

The present invention has for an object to remedy or minimise these disadvantages and particularly a logic protection circuit for carrying out the $\bar{A}$.B. operation, and comprising, in combination: a transistor or like electronic device operating in the same fashion, connected to a source of direct current; a first control circuit for the transistor or the like comprising an integrating device; a second control circuit for the transistor or the like comprising an impedance matching device; and an output circuit for the transistor or the like delivering a signal, the only two possible values of which correspond to the presence or to the absence of oscillations, the respective values of the elements of the control circuits being selected so as to render the transistor or the like conductive only when the first control circuit is not supplied and when a recurrent signal passes through the second control circuit.

Other characteristics of the invention will become evident from the following description, reference being made to the accompanying drawings. It will be understood that this description and these drawings are given only by way of example.

Figure 2:
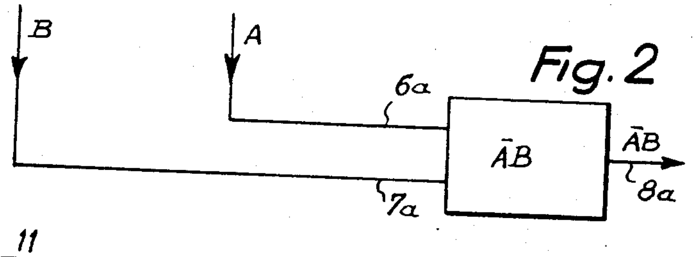
Figure 3:
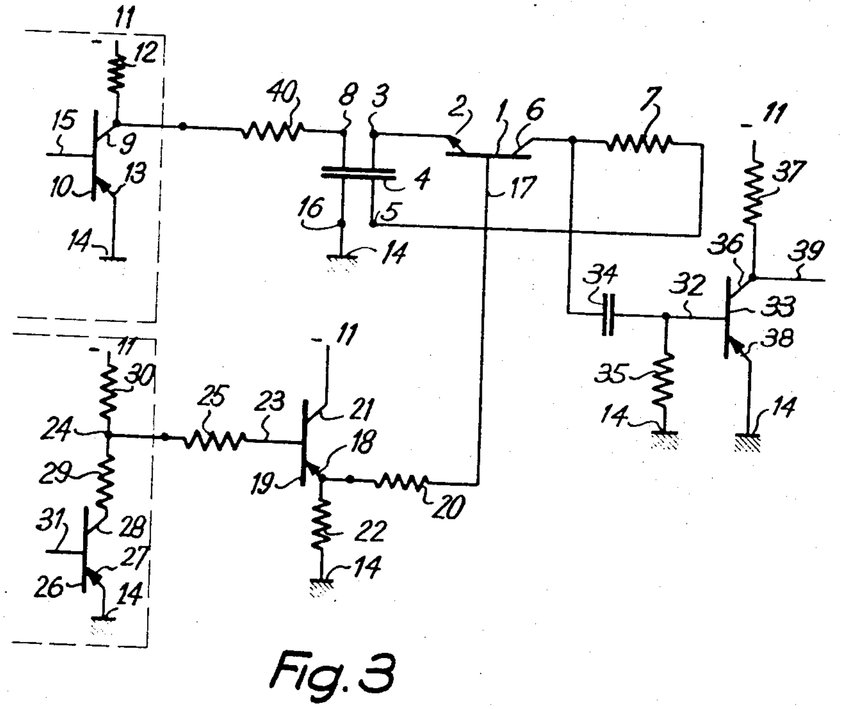
Figure 4:
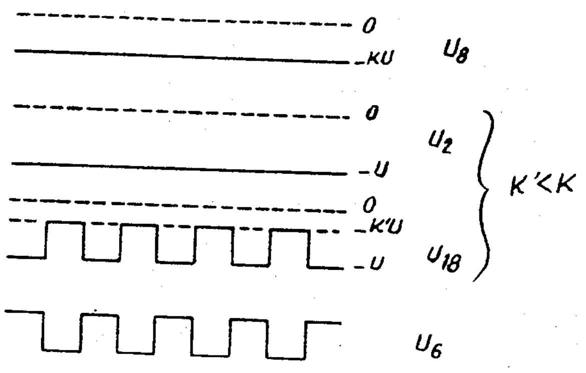
Figure 5:
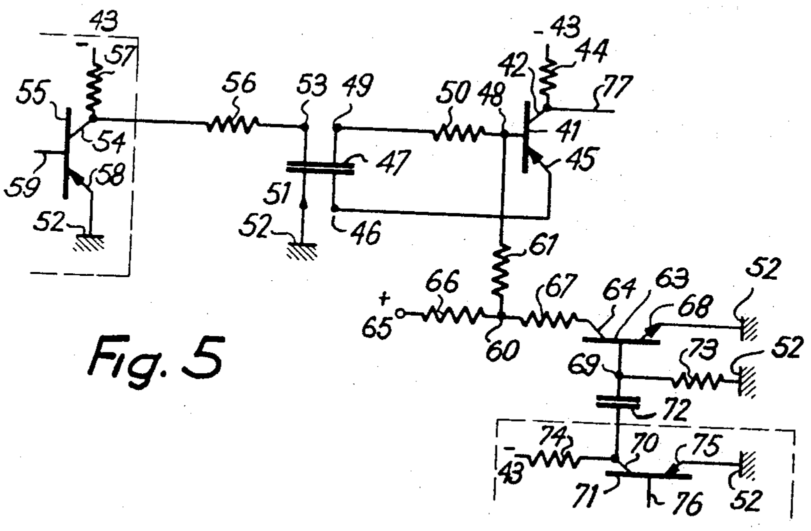
Figure 6:
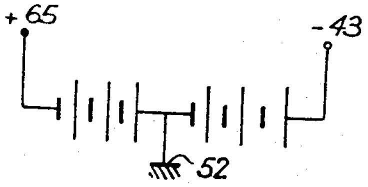

In the drawings:

FIGURES 1 and 2 show logic diagrams of a circuit according to the invention,

FIGURE 3 shows an electrical circuit diagram of an embodiment of logic circuits according to the invention, FIGURE 4 shows the distribution of the signals collected at various points of the circuit shown in FIGURE 3, FIGURE 5 shows an electrical circuit diagram of a second embodiment of a logic circuit according to the invention, and FIGURE 6 shows an arrangement of the two sources of direct current utilised by the circuit shown in FIGURE 5.

Referring now to the drawings, FIGURE 1 shows a logic diagram obtained by combining a NOT (French PAS) circuit and an AND circuit. The input 1*a* of the NOT circuit is connected to a circuit (not shown on the figure) for ensuring the function A. The output 2*a* of the NOT circuit is connected to a first input 3*a* of an AND circuit. The second input 4*a* of the AND circuit is connected to a circuit (not shown on the figure) for ensuring the function B.

In consequence of the insertion of the NOT circuit, when the function A and B both transmit a signal, no signal passes through the input 3*a*, whilst the input 4*a* receives the signal coming from the function B. No signal passes through the output 5*a* of the AND circuit.

On the other hand, when the function A does not transmit any signal and when the function B transmits a signal, a signal then passes through the output 5*a* of the AND circuit.

This is explained by the logic diagram shown in FIGURE 2, in which the input 6*a* of the operator $\bar{A}$.B. corresponds to the input 1*a* of the NOT circuit, and the input 7*a* of this operator corresponds to the input 4*a* of the AND circuit. The signal appearing at the output 8*a* of the operator is identical to the signal appearing on the output 5*a* of the AND circuit when the two logic diagrams shown in FIGURES 1 and 2 operate in the same conditons.

The circuit diagram shown in FIGURE 3 is the logical expression of the diagram shown in FIGURE 2.

As FIGURE 3 shows, the logic circuit of the $\bar{A}$.B. type comprises a transistor 1 of the NPN type, the emitter 2 of which is connected to one of the terminals 3 of a capacitor 4 having four connections. The terminal 5 of this capacitor, homologous with the terminal 3, is connected to the collector 6 of the transistor 1 through a resistor 7. The terminal 8 of the capacitor located on the same side as the terminal 3, is connected to the collector 9 of a transistor 10 of the PNP type through a resistor 40.

The collector 9 of the transistor 10 is connected to the negative terminal 11 of a source of direct current through a resistor 12. The emitter 13 of the transistor 10 is connected to the positive terminal of the said source, this positive terminal being connected to ground 14. The base 15 of the transistor 10 is connected to an oscillator, or any other member having identical operation (not shown in the figure).

The fourth terminal 16 of the capacitor located on the same side as the terminal 5, is connected to ground 14.

The base 17 of the transistor 1 is connected to the emitter 18 of a transistor 19 of the PNP type through a resistor 20. The collector 21 of the transistor 19 is connected to the negative terminal 11 of the source of direct current; the emitter 18 being connected to ground 14 through a resistor 22.

The base 23 of the transistor 19 is connected to a terminal 24 through a resistor 25, this terminal being in the collector circuit of a transistor 26 of the PNP type.

The emitter 27 of the transistor 26 is connected to ground 14. The collector 28 of this transistor is connected to the negative terminal 11 of the source of direct current, through two resistors 29 and 30 mounted in series, the terminal 24 being common to the resistors 29 and 30.

The base 31 of the transistor 26 is connected to an oscillator (not shown in the figure) or to any other member having identical operation.

For example, the bases 15 and 31 of the transistors 10 and 26 may be connected to logic circuits of conventional type; AND circuit, OR circuit, memory, if the logic circuit according to the invention is used in the logical data processing.

The collector 6 of the transistor 1 is connected to the base 32 of a transistor 33 of the PNP type, through a capacitor 34. The base 32 is also connected to ground 14 through a resistor 35. The collector 36 of the transistor 33 is connected to the negative terminal 11 of the source of direct current through a resistor 37. The emitter 38 of the transistor 33 is connected to ground 14.

The output of the logic circuit forming the subject of the invention is constituted by a conductor 39 connected to the collector 36 of the transistor 33.

The capacitor 4 and the resistor 40 constitute a first control circuit for the transistor 1. These two elements also form an integrating device, the values of these elements being selected so that the time constant of this integrating device is at least equal to six times the period of the oscillatory signal capable of appearing at the collector 9 of the transistor 10.

The resistors 40 and 12 are selected so that the potential appearing at the terminal 8 is proportional to the voltage of the source of direct current. If U designates the value of the voltage of said source, the potential of the terminal 8 is equal to KU, K being a coefficient of proportionality having a value lower than unity.

The resistors 29 and 30 in the collector circuit of the transistor 26 have appropriate values such that the potential appearing at the terminal 24 lies between the values U and KU previously defined, when the transistor 26 is saturated.

The transistor 19 permits, in addition to a protective function which will be indicated later, an impedance match corresponding to an impedance decrease in the direction from transistor 26 to transistor 19. Thus, when the transistor 26 transmits a recurrent signal causing it to pass alternately from the locked state to that of saturation, the potential U18 appearing on the collector 18 of the transistor 19 varies between the values —U and —K′U, as shown in FIGURE 4, K′ being a coefficient of proportionality of value lower than unity.

The transistor 19 and the resistors 20, 22 and 25 form a second control circuit for the transistor 1. The elements of the control circuit are chosen so that the coefficient K′ has a value lower than that of the coefficient K.

When the transistor 10 transmits a recurrent signal, the potential U8 appearing at the terminal 8 of the capacitor 4 takes the continuous value —KU as is shown in FIGURE 4.

When the transistor 26 transmits a recurrent signal, the potential appearing at the collector 18 of the transistor 19 has the shape U18 shown in FIGURE 4 and oscillates between the values —U and —K′U.

The potential appearing at the base 17 of the transistor 1 thus has a value which is always lower than the value of the potential appearing at the emitter of the transistor 1. This transistor is then cut off since its emitter-base diode is polarised in the sense opposite to conduction. No recurrent signal is transmitted by the transistor 1.

If 0 and 1 designate the binary states of the signal appearing at the output of the logic circuit and corresponding respectively to the absence and to the presence of oscillations, the output digit of said circuit is at 0.

When no signal is transmitted by the transistor 10, the potential U2 appearing at the emitter 2 of the transistor 1 is constant, as shown in FIGURE 4, and its value is —U.

When a recurrent signal is transmitted by the transistor 26, the potential appearing at the base 17 of the transistor 1 has substantially the shape U18 shown in FIGURE 4. For the value —U of the potential U18, the transistor 1 is cut off since its emitter-base diode is polarised in the sense opposite to conduction. When the potential U18 has —K′U as its value, the potential of the base 17 of the transistor 1 is positive with respect to the potential of the emitter of this transistor. The transistor 1 is then conductive.

The characteristics of the transistor 1 are selected so that this transistor passes alternatively from the cut-off state to that of saturation when it receives the previously defined signals. The recurrent signal appearing at the collector 6 of the transistor 1 has the shape U6 shown in FIGURE 4 and oscillates substantially between the values 0 and —KU. This signal is transmitted to the base 32 of the transistor 33 through the capacitor 34 and a recurrent signal appears at the output 39 of the logic circuit, forming the subject of the invention. By utilising the previously defined logic denomination, the logic output digit is at I.

According to an example of use of this logic circuit, the characteristics of the transistor 33 of the output circuit are selected so as to permit the transmission of a recurrent signal whose shape is identical to that transmitted by the transistor 26.

If no recurrent signal is transmitted by the transistor 26, the potential appearing at the base 17 of the transistor 1 is near the value —U and, whatever may be the signal, recurrent or not, transmitted by the transistor T, the potential appearing at the emitter 2 of the transistor 1 is constantly negative with respect to the potential appearing at the said base. Thus, the output digit at the collector 36 of the transistor 33 is equal to 0.

The following table summarises the different faults capable of affecting the components of the logic circuit of the invention, which has just been described and indicates the output digit produced by each of these faults.

| Elements in question | Disconnection | Short-circuit |
|---|---|---|
| Transistor 33 | The output 39 remains at the potential −U. Output digit U39=0. | The output 39 remains at the potential 0. Output digit U39=0. |
| Transistor 1 | The collector 6 remains at the potential −U. Output digit U39=0. | The collector remains at a constant potential. No oscillations. U39=0. |
| Transistor 19 | The potential U18 remains at 0. The transistor 1 cannot oscillate, neither can the transistor 33. U39=0. | The potential U18 remains at the value −U. The transistor 1 is blocked, no oscillation is transmitted by the transistor 33. U39=0. |
| Resistor 37 | The transistor 33 can no longer oscillate. U39=0. | The transistor 33 can no longer oscillate. It is even destroyed. U39=0. |
| Resistor 35 | The transistor 33 can no longer receive a recurrent signal from the transistor I, because the capacitor 34 cannot be discharged. U39=0. | The transistor 33 is permanently cut off. U39=0. |
| Resistor 7 | The transistor 1 can no longer oscillate, its collector 6 being isolated. U39=0. | The potential appearing at the collector 6 of the transistor 1 has a constant value of nil. U39=0. |

TABLE—Continued

| Elements in question | Disconnection | Short-circuit |
|---|---|---|
| Resistor 40 | The emitter of the transistor 1 is isolated, the transistor cannot oscillate. U39=0. | Cannot be short-circuited by construction. Its short-circuit would not modify the operation of the $\bar{A}$.B. circuit, but the oscillation of the transistor 10 would be integrated after the collector 9, risking delivering a signal corresponding to A=0 for other other circuits connected at 10. |
| Resistor 20 | The transistor 1 can no longer oscillate. U39=0. | Cannot be short-circuited by construction. |
| Resistor 22 | The transistor 19 can no longer oscillate. U39=0. | The potential appearing at the collector 18 remains at the value 0. The transistor can no longer oscillate. U39=0. |
| Capacitor 4 | This capacitor has 4 outputs. A disconnection isolates either the emitter of the transistor 1, or its collector. U39=0. | The emitter of the transistor 1 is connected to ground. The transistor 1 can no longer oscillate. U39=0. |
| Capacitor 34 | The transistor 33 ceases to oscillate. U39=0. | The transistor 33, taking into account its cut-off frequency characteristics, no longer transmits the oscillation received, the capacitor 34 having the purpose precisely to faciliate cutting off and releasing of the transistor 33, for the selected frequency of use. |

Thus, whatever may be the fault capable of affecting the components of the logic circuit, forming the subject of the invention, it will be seen after studying the foregoing table, that the output digit appearing at the collector 36 of the transistor 33 is nil.

The transistors 10 and 26 shown in FIGURE 3 present the functions A and B previously defined and referred to in FIGURES 1 and 2.

FIGURE 5 shows a second embodiment of a logic circuit for effecting the operation $\bar{A}$.B. and is characterised essentially in that it uses two sources of direct current connected to the same ground point as shown in FIGURE 6.

In the example shown the two sources of current are produced by the same source, an intermediate point being connected to ground.

As shown in FIGURE 5, the logic circuit $\bar{A}$.B. comprises a transistor 41 of the PNP type, the collector 42 of which is connected to the negative terminal 43 of the first source of direct current through a resistor 44. The emitter 45 of the transistor 41 is connected to a terminal 46 of a capacitor 47 having four outputs. The base 48 of the transistor 41 is connected to a second terminal 49 of the capacitor 47 through a resistor 50, the terminal 49 being located opposite the terminal 46.

The terminal 51 of the capacitor 47, located on the same side as the terminal 46, is connected to ground 52, or a terminal common to the two sources of direct current, as has been specified previously.

The fourth terminal 53 of the capacitor 47 is connected to the collector 54 of a transistor 55 of the PNP type through a resistor 56. The collector 54 is connected to the negative terminal 43 of the first source through a resistor 57, the emitter 58 of the transistor 55 being connected to ground 52.

The base 59 of the transistor 55 is connected to an oscillator or to any other member of identical operation (not shown in the figure).

The base 48 of the transistor 41 is connected to a terminal 60 through a resistor 61. This terminal 60 is located in the collector circuit of a transistor 63 of the NPN type. The collector 64 of the transistor 63 is connected to the positive terminal 65 of the second D.C. source through two resistors 44 and 67 in series, the terminal 60 being common to the resistors 66 and 67, the emitter 68 of the transistor 63 is connected to ground 52.

The base 69 of the transistor 63 is connected to the collector 70 of a transistor 71 of the PNP type through a capacitor 72. The base 69 is also connected to ground 52 through a resistor 73.

The collector 70 of the transistor 71 is connected to the negative terminal 53 of the first source of direct current through a resistor 74, the emitter 75 of the transistor 71 being connected to ground 52. The base 76 of the transistor 71 is connected to an oscillator (not shown on the figure) or to any other member of identical operation.

The bases 59 and 76 of the transistors 55 and 71 may be connected for example to logic circuits of the protection type, viz an AND circuit, an OR circuit, or a memory circuit, in the case where the logic circuit of the invention is utilised for logical data processing.

The capacitor 47 and the resistors 50 and 56 constitute a first control circuit for the transistor 41. The transistor 63, the capacitor 72 and the resistors 61, 66, 67 and 73 form a second control circuit for the transistor 41.

The resistor 56 and the capacitor 47 form an integrating device for a recurrent signal transmitted by the transistor 55.

The resistors 50, 61, 66 and 67 form a voltage divider. The values of these resistors are selected so that the base 48 of the transistor 41 is at a positive potential when the transistors 55 and 71 transmit recurrent signals. The transistor 41 is then cut off and no recurrent signal appears at the output 77 connected to the collector 42 of the transistor 41. By utilising the same logical denomination as that indicated previously, the output digit of the logic circuit is in the 0 state.

When no oscillation is transmitted by the transistor 55, the recurrent signal from the transistor 71 and appearing on the terminal 60 of the collector circuit of the transistor 63, causes the potential at the base 48 to pass automatically from a positive value to a negative value. A recurrent signal is transmitted by the transistor 41. The output digit of the logic circuit is then I.

When no recurrent signal is transmitted by the transistor 71, the base 48 of the transistor 41 remains at a positive potential whatever may be the nature of the signal, recurrent or not, transmitted by the transistor 55.

The transistor 41 is cut off and the output digit of the logic circuit is 0.

The following table summarises the different faults capable of affecting the components of the logic circuit shown in FIGURE 5, and indicates the output digit produced by each of these faults.

| Elements in question | Disconnection | Short-circuit |
|---|---|---|
| Transistor 41 | The transistor 41 no longer oscillates. Output digit U77=0. | The transistor 41 no longer oscillates. Output digit U77=0. |
| Transistor 63 | The terminal 60 is taken to a constant potential maintaining the transistor 41 in a cut-off condition. U77=0. | The terminal 60 is taken to a constant potential maintaining the transistor 41 in a cut-off condition. U77=0. |
| Resistor 56 | The base of the transistor 41 cannot be taken to a negative potential. The transistor 41 remains cut-off. U77=0. | Cannot be short-circuited by construction. |
| Resistor 50 | do | Do. |
| Resistor 61 | No recurrent signal can be transmitted to the transistor 41. U77=0. | Do. |
| Resistor 66 | The transistor 63 can no longer oscillate. U77=0. | Do. |
| Resistor 77 | The resistors 41 and 63 can no longer oscillate. U77=0. | Do. |
| Capacitor 47 | The capacitor has four outputs. When one of the outputs is disconnected, the emitter-base discharge of the transistor 41 is impossible. U77=0. | The transistor 41 remains cut-off. U77=0. |
| Resistor 44 | The collector of the transistor is isolated, this transistor cannot oscillate. U77=0. | Cannot be short-circuited by construction. |

Thus, whatever may be the fault capable of affecting the components of this logic circuit, after studying this table, it will be seen that the output digit appearing at the collector 42 of the transistor 41 is nil.

The transistors 55 and 71 shown in FIGURE 5 present the function A and B shown in FIGURES 1 and 2 and are not part of the said $\overline{A}$.B. operator.

The invention is not limited to the embodiments described and shown but covers all modifications thereof, particularly concerning the connections of the control circuit, these connections having to be selected so as to render the transistor conductive only when the first control circuit is not supplied when the second control circuit is traversed by a recurrent signal.

What is claimed is:

1. A logic protection circuit having a combined AND/NOT function for producing a restrictive output in the event an internal component of said circuit malfunctions comprising:

a transistor switchable between a restrictive output state and a non-restrictive output state in response to a predetermined level of bias voltage;

a four terminal capacitor for integrating a first recurrent input signal, the first and second terminals of said capacitor being connected, respectively, to an input resistor and ground, and the third and fourth terminals of said capacitor being connected across said transistor in order to apply the integrated signal to said transistor as a biasing influence;

impedance matching circuit means connected to a base electrode of said transistor for applying a second recurrent input signal to said transistor as a biasing influence; and an output circuit connected to the collector of said transistor.

2. A logic circuit as described in claim 1 wherein the third terminal of said capacitor is connected through a ressitor to the base of said transistor and the fourth terminal of said capacitor is connected to the emitter of said transistor.

3. A logic circuit as described in claim 2 wherein said impedance matching circuit means include a second transistor having a base electrode adapted to receice said second input signal through a capacitor.

4. A logic circuit as described in claim 1 wherein the third terminal of said capacitor is connected to the emitter of said transistor and the fourth terminal of said capacitor is connected through a resistor to the collector of said transistor.

5. A logic circuit as described in claim 4 wherein said impedance matching circuit means include a second transistor having a base adapted to receive said second input signal through a voltage divider.

References Cited

UNITED STATES PATENTS

| | | | |
|---|---|---|---|
| 3,015,737 | 1/1962 | Harris et al. | 307—88.5 |
| 3,087,074 | 4/1963 | Carroll et al. | 307—88.5 |

ARTHUR GAUSS, *Primary Examiner.*

DONALD D. FORRER, *Assistant Examiner.*